United States Patent
Romig et al.

(10) Patent No.: US 11,525,739 B2
(45) Date of Patent: Dec. 13, 2022

(54) THERMISTOR DIE-BASED THERMAL PROBE

(71) Applicant: Texas Instruments Incorporated, Dallas, TX (US)

(72) Inventors: Matthew David Romig, Wylie, TX (US); Steven Aldred Kummerl, Carrollton, TX (US); Steve Edward Harrell, Corinth, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 765 days.

(21) Appl. No.: 15/973,964

(22) Filed: May 8, 2018

(65) Prior Publication Data
US 2019/0346312 A1    Nov. 14, 2019

(51) Int. Cl.
| | |
|---|---|
| *H01C 7/10* | (2006.01) |
| *G01K 1/08* | (2021.01) |
| *H01C 7/00* | (2006.01) |
| *G01K 7/24* | (2006.01) |
| *H01C 1/01* | (2006.01) |
| *H01C 1/034* | (2006.01) |
| *H01C 17/00* | (2006.01) |

(52) U.S. Cl.
CPC ............. *G01K 1/08* (2013.01); *G01K 7/24* (2013.01); *H01C 1/01* (2013.01); *H01C 1/034* (2013.01); *H01C 7/008* (2013.01); *H01C 17/006* (2013.01)

(58) Field of Classification Search
CPC .. G01K 7/16; G01K 7/22; G01K 1/08; G01K 7/24; G01K 7/01; G01K 13/00; G01K 1/14; G01K 7/00; H01C 17/006; H01C 17/02; H01C 1/144; H01C 7/008; H01C 7/10; G01N 33/48785
See application file for complete search history.

(56) References Cited

U.S. PATENT DOCUMENTS

| | | | | |
|---|---|---|---|---|
| 3,982,276 A | * | 9/1976 | Roos ..................... | G11B 5/62 360/17 |
| 4,079,350 A | * | 3/1978 | Sentementes .......... | H01C 7/022 338/22 R |
| 4,166,451 A | * | 9/1979 | Salera .................... | A61B 5/01 338/22 R |
| 4,186,368 A | * | 1/1980 | White ..................... | G01K 1/16 338/28 |
| 4,712,085 A | * | 12/1987 | Miki ....................... | G01K 7/223 29/612 |

(Continued)

FOREIGN PATENT DOCUMENTS

| | | | |
|---|---|---|---|
| CN | 202332569 U | * | 7/2012 |
| CN | 102751061 A | * | 10/2012 |

(Continued)

*Primary Examiner* — Gail Kaplan Verbitsky
(74) *Attorney, Agent, or Firm* — Ronald O. Neerings; Frank D. Cimino

(57) ABSTRACT

A thermistor-based thermal probe includes a thermistor die having a thermistor thereon with first and second bond pads coupled across the thermistor, and first and second die interconnects coupled to the respective bond pads. First and second wires W1, W2 that extend beyond the thermistor die are attached to the first and to the second die interconnects, respectively. An encapsulant material encapsulates the thermistor die and a die end of the first and second wires.

24 Claims, 5 Drawing Sheets

(56) References Cited

U.S. PATENT DOCUMENTS

| | | | | |
|---|---|---|---|---|
| 4,952,902 | A * | 8/1990 | Kawaguchi | H01C 7/042 252/516 |
| 5,372,427 | A * | 12/1994 | Padovani | G01K 1/16 338/22 R |
| 5,483,741 | A * | 1/1996 | Akram | G01R 1/06738 29/846 |
| 5,763,929 | A * | 6/1998 | Iwata | H01L 27/0211 257/467 |
| 6,147,589 | A * | 11/2000 | Ohmura | H01C 7/043 338/22 R |
| 6,368,734 | B1 * | 4/2002 | Mihara | C04B 35/01 257/703 |
| 6,380,840 | B1 * | 4/2002 | Wienand | G01K 7/183 338/25 |
| 6,588,094 | B2 * | 7/2003 | Furukawa | H01C 7/008 29/610.1 |
| 7,470,999 | B2 * | 12/2008 | Saito | C03C 3/087 257/794 |
| 8,092,085 | B2 * | 1/2012 | Kawase | G01K 7/223 374/183 |
| 8,373,535 | B2 * | 2/2013 | Lavenuta | G01K 7/226 338/22 R |
| 9,312,054 | B2 * | 4/2016 | Watanabe | H01C 1/02 |
| 9,322,718 | B2 * | 4/2016 | Takahashi | G01K 7/22 |
| 9,576,736 | B2 * | 2/2017 | Tsubokawa | H01G 4/12 |
| 9,693,482 | B2 | 6/2017 | Feichtinger et al. | |
| 9,851,262 | B2 * | 12/2017 | Nagatomo | H01C 1/1413 |
| 9,958,336 | B2 * | 5/2018 | Ihle | G01K 7/223 |
| 10,366,830 | B2 * | 7/2019 | Fukuda | H01C 1/144 |
| 10,840,008 | B2 * | 11/2020 | Kainuma | H01F 27/292 |
| 10,840,021 | B2 * | 11/2020 | Yamada | H01G 4/2325 |
| 2004/0046636 | A1 * | 3/2004 | Ito | H01C 1/028 338/22 R |
| 2005/0174112 | A1 * | 8/2005 | Wakabayashi | G01R 33/07 324/251 |
| 2009/0325349 | A1 * | 12/2009 | Hashimoto | H01L 23/291 438/127 |
| 2013/0077653 | A1 * | 3/2013 | Koshimizu | G01K 1/10 374/185 |

FOREIGN PATENT DOCUMENTS

| | | | | |
|---|---|---|---|---|
| CN | 204479204 U | * | 7/2015 | |
| CN | 106654846 | | 5/2017 | |
| JP | 08064925 A | * | 3/1996 | H01L 24/02 |
| JP | 2009008431 A | * | 1/2009 | |

* cited by examiner

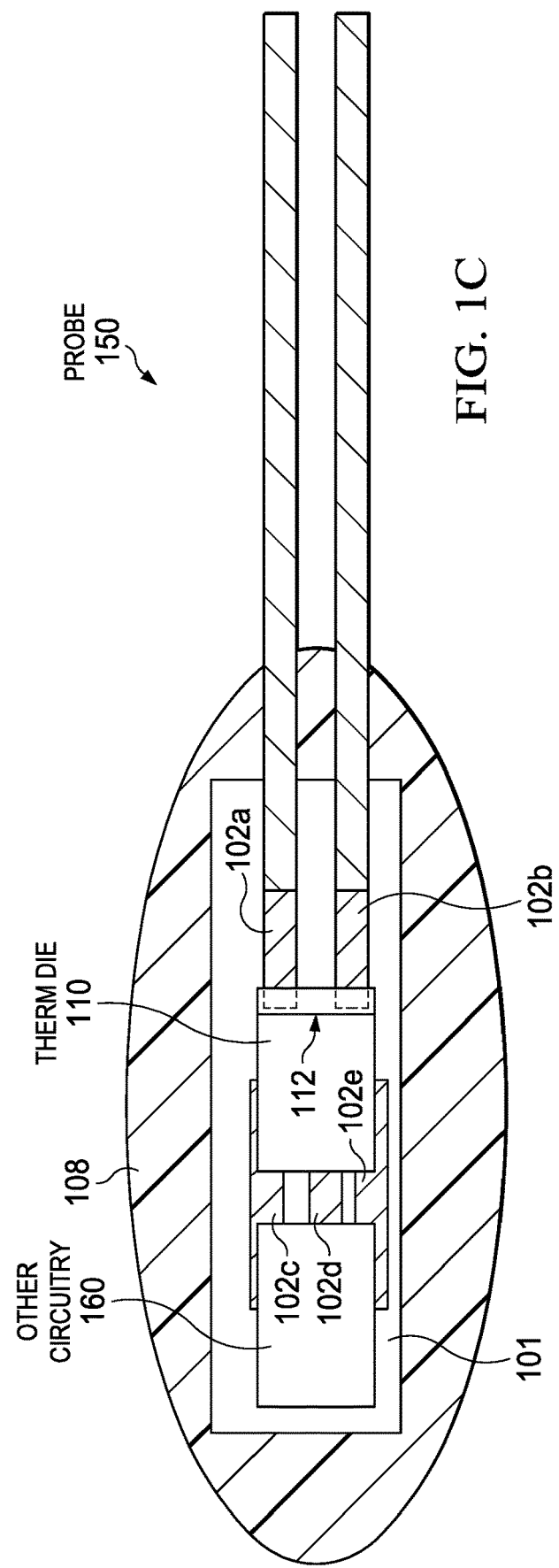

THERMISTOR DIE-BASED THERMAL PROBE

FIELD

This Disclosure relates to thermistor-based thermal probes.

BACKGROUND

A bi-metallic "bead" can be formed using two wires of different metal materials to provide a thermal probe. Thermistor probes for temperature sensing are also known. Conventional thermistor probes include a thermally responsive resistor material generally comprising metal oxide particles that are embedded within a ceramic, epoxy, or a glass. Such conventional thermistors generally show a large negative and nonlinear change in resistance, generally expressed as the resistance change per degree of temperature change.

These known thermistors are manufactured using pressed disc, rod, plate, bead, or cast chip processing. Since the thermistor is a temperature variable resistor, one needs to measure the resistance before calculating the temperature. However, one cannot measure the resistance directly, only generally measuring a voltage, typically using a voltage divider with the thermistor being one of the resistors in the voltage divider.

The equation for the output voltage of a voltage divider is Vout=Vin×R2/(R1+R2), where Vout is voltage at a node between the thermistor and a known resistor, Vin is the applied input voltage, say 5 V, R1 is a known resistor value, and R2 is a resistance of the thermistor that varies with temperature. This equation can be rearranged and simplified to be solved for R2. Finally, the Steinhart-Hart equation can be used to convert R2 (the resistance of the thermistor) to a temperature reading, or as an alternative signal processing circuitry can also be used for this purpose.

SUMMARY

This Summary is provided to introduce a brief selection of disclosed concepts in a simplified form that are further described below in the Detailed Description including the drawings provided. This Summary is not intended to limit the claimed subject matter's scope.

This Disclosure recognizes conventional thermal probes having thermistors comprising metal oxide particles embedded within a ceramic, epoxy, or a glass are generally high in cost to implement as compared to disclosed thermal probes that use die-based thermistors. Disclosed die-based thermistors enables a disclosed packaged thermal probe to provide a small thermal mass and mechanical robustness, with long wires for contact to facilitate a relatively long distance connection thereto.

Disclosed aspects also include a method of fabricating a thermistor die-based thermal probe. A first die interconnect and a second die interconnect are attached to bond pads that are coupled across a thermistor on a thermistor die (e.g., a silicon die). First and second wires are attached to the first and second die interconnects. The first and second wires extend beyond the thermistor die. An encapsulating material is formed over the thermistor die and a die end of the first and second wires. Other embodiments include a mounting substrate, such as a printed circuit board (PCB) or a flexible circuit between the thermistor die and the first and second wires.

BRIEF DESCRIPTION OF THE DRAWINGS

Reference will now be made to the accompanying drawings, which are not necessarily drawn to scale, wherein:

FIG. 1C shows a top view of an example thermistor die-based thermal probe on a mounting substrate coupled to temperature sensing and signal processing circuit on another die.

DETAILED DESCRIPTION

Figure 1A:
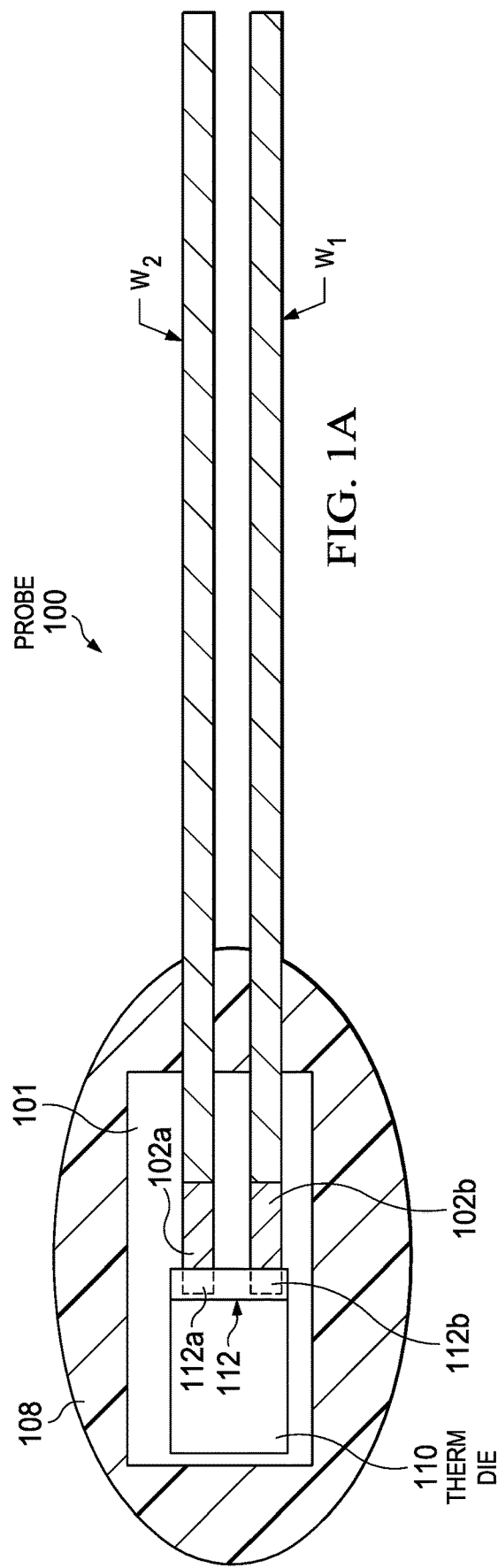
FIG. 1A shows a top view of an example thermistor die-based thermal probe comprising a mounting substrate with a thermistor die having a thermistor mounted thereon.

Example aspects in this disclosure are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1A shows an enhanced top view of an example thermistor die-based thermal probe 100 comprising a mounting substrate 101 with a thermistor die 110 (shown as a 'therm' die) having a thermistor 112 formed therein (e.g., a diffused resistor) or thereon (e.g., a polysilicon resistor) that is flip chip mounted to the mounting substrate 101. A thermistor die refers to a generally rectangular or other 2D shaped volume that is cut (or singulated) from a substrate including a plurality of die known in the art as a wafer. The thermistor die 110 has bond pads 112a, 112b (shows as dashed lines as they are on the underside) connected across ends of the thermistor 112 (shows as dashed lines as they are also on the underside).

Figure 1B:
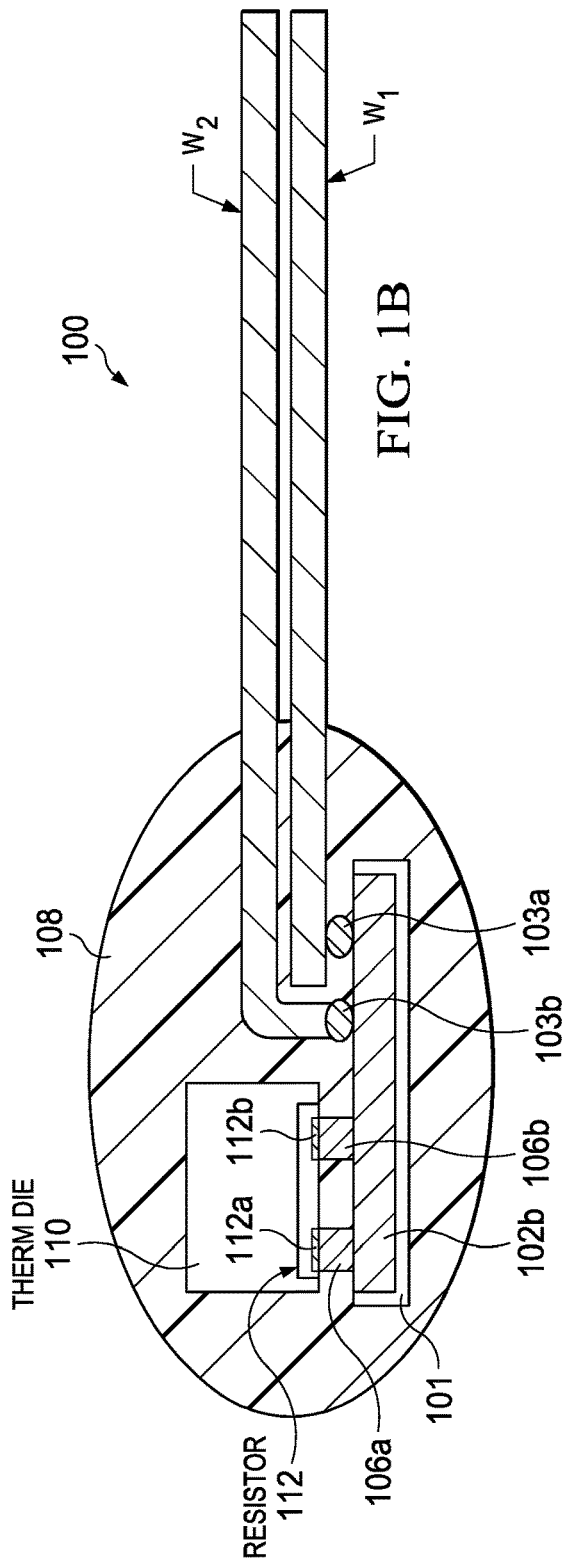
FIG. 1B shows a side view of the thermistor die-based thermal probe shown in FIG. 1A that reveals the first and second die interconnects and first and second wire interconnects that are all not visible in the top view of FIG. 1A.

FIG. 1B shows a side view of the semiconductor-based thermal probe 100 shown in FIG. 1A that reveals the first and second die interconnects 106a, 106b, and first and second wire interconnects 103a and 103b that are all not visible or shown in the top view of FIG. 1A. The first and second interconnects 106a, 106b shown in FIG. 1B couple the first and second bond pads 112a, 112b on the thermistor die 110 that are flip chip attached to a first and a second trace 102a, 102b shown in FIG. 1A on the mounting substrate 101. As noted above the mounting substrate can comprise a PCB or a flexible (flex) circuit. A flex circuit conventionally comprises patterned copper on a flexible polymer film such as sold under the tradename KAPTON which comprises polyimide. These circuits offer the benefit of flexibility to permit flexing defined herein to have their usual thickness of 0.0005" (inches) to 0.010", where the flex circuit can be single-sided, double-sided, or multi-layer.

The substrate for the thermistor die 110 can comprise a ceramic material, a semiconductor material such as silicon, or a glass material. There are first and second wires (e.g., comprising copper) shown as W1 and W2 that extend beyond the mounting substrate 101 which are attached by the first and second wire interconnects 103a and 103b to the first and second traces 102a, 102b on the mounting substrate 101. An encapsulating material 108, such as epoxy, encapsulates the thermistor die 110, the mounting substrate 101, and a die end of W1 and W2.

The first and second die interconnects 106a, 106b, and first and second wire interconnects 103a and 103b can for example comprise solder balls (or bumps), a copper (Cu) pillar with a tin (Sn) cap, or pillars comprising Cu/nickel (Ni)/gold (Au), Cu plus Organic Solderability Preservatives (OSPs), also known as anti-tarnish, or Cu/Ni/palladium (Pd)/Au. In the case of solder balls or bumps, the interconnects 106a, 106b can be made through the use of solder assembled through a pick-and-place process, which is subsequently reflowed. For a Cu pillar with a Sn cap a 'flux dip' method can be used.

The thermistor 112 can generally comprise any known resistor structure that has a minimum temperature coefficient (tempco) of at least 3,000 parts per million (PPM)/° C. The tempco of the resistor can be 6,000 to 6,500 PPM/° C. For example, a diffused (pn junction) silicon resistor generally with a relatively low doping level of about $1 \times 10^{15}$ cm$^{-3}$ up to $1 \times 10^{17}$ cm$^{-3}$, or a doped polysilicon resistor or an epitaxial resistor with about this same doping level range. The thermistor 112 can be a negative temperature coefficient (NTC) thermistor where the resistance decreases with an increase in temperature, or a positive temperature coefficient (PTC) thermistor where the resistance increases with an increase in temperature.

FIG. 1C shows a top view of an example thermistor die-based thermal probe 150 comprising a thermistor die 110 on a mounting substrate 101 coupled to a temperature sensing and signal processing circuitry die 160 shown as 'other circuitry' comprising active and passive circuitry, thus shown being on a separate die. In the embodiment shown the mounting substrate 101 further comprises traces 102c, 102d and 102e that couple bond pads on the temperature sensing and signal processing circuitry die 160 that couple to the bond pads on the thermistor die 110.

In an alternate embodiment, the wires W1 and W2 can be solder coupled directly to bond pads on the thermistor die 110. These wire to bond pad solder-based connections may not be as mechanically robust as for the semiconductor-based thermal probe 100 which includes a mounting substrate 101, but the glob of the encapsulating material 108 will generally provide sufficient mechanical robustness.

Figure 2A:
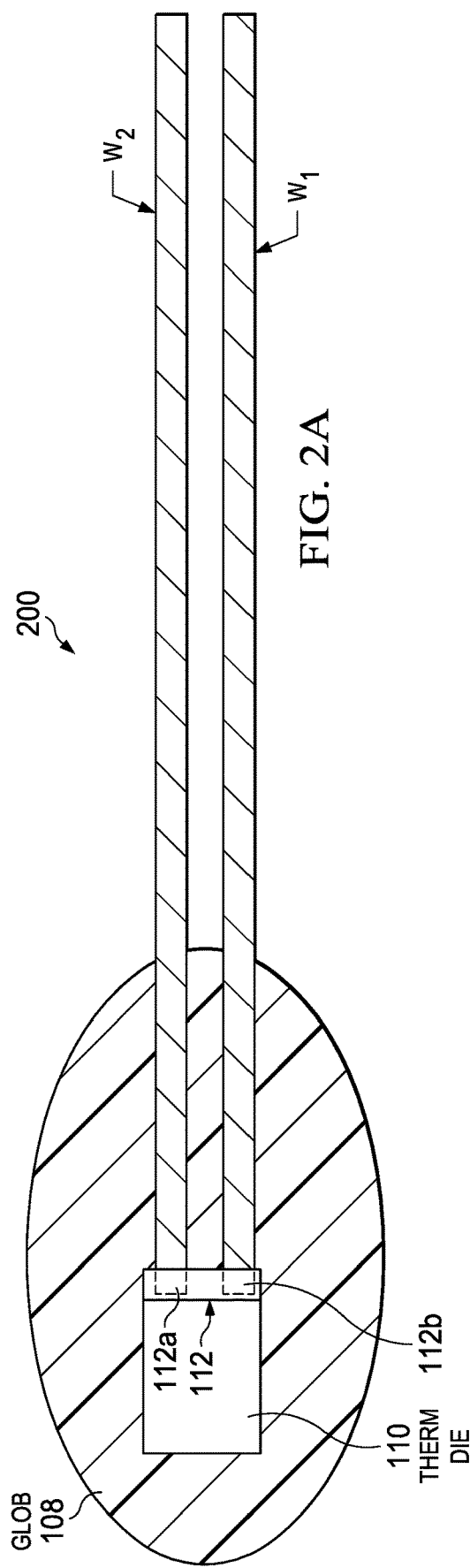
FIG. 2A shows a top view of an example thermistor die-based thermal probe comprising a thermistor die having bond pads directly attached to wires W1 and W2.
Figure 2B:
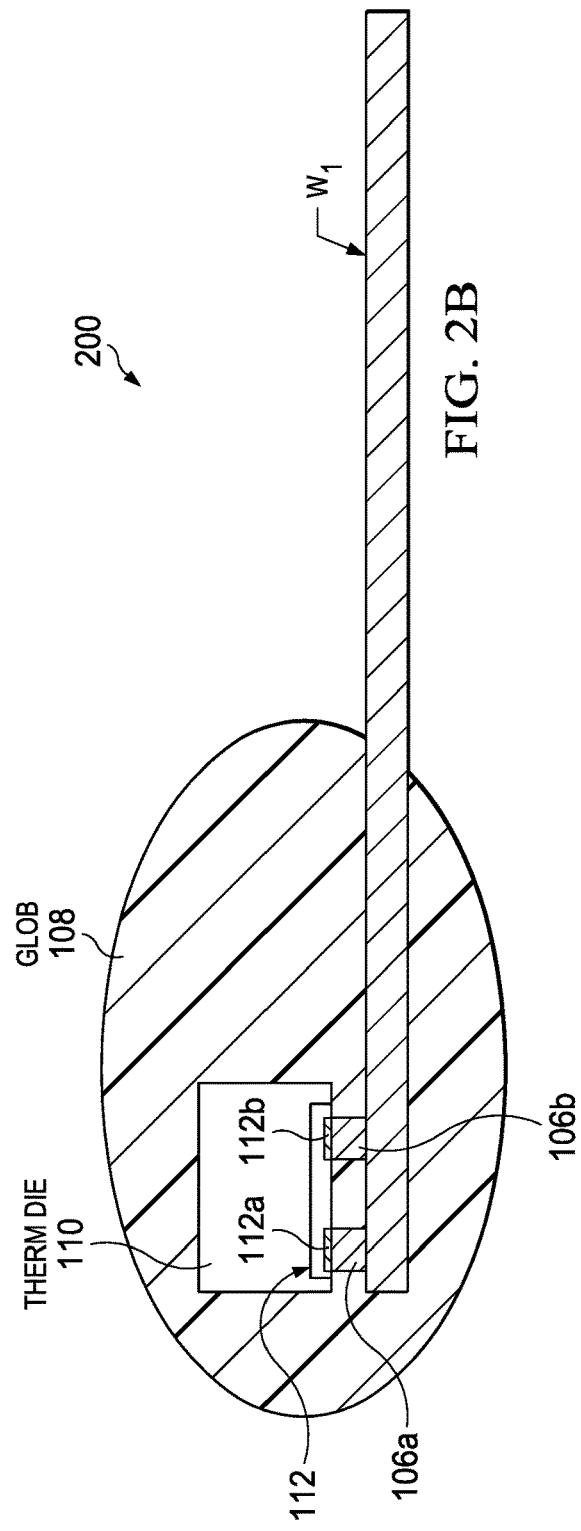
FIG. 2B shows a side view of the thermistor die-based thermal probe shown in FIG. 2A that reveals the first and second die interconnects that are not visible in the top view of FIG. 1A.

FIG. 2A shows a top view of an example thermistor die-based thermal probe 200 comprising a thermistor die 110 having bond pads directly attached to W1 and W2. FIG. 2B shows a side view of the thermistor die-based thermal probe 200 shown in FIG. 2A that reveals the first and second die interconnects 106a, 106b that are all not visible in the top view of FIG. 2A.

Figure 3A:
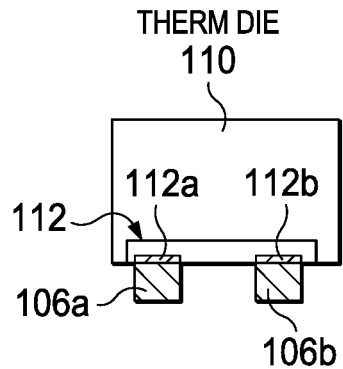
FIGS. 3A-3C shows enhanced side views of a disclosed thermistor die-based thermal probe after successive in-process assembly steps, with the completed thermistor die-based thermal probe shown in FIGS. 1A and 1B described above.
Figure 3B:
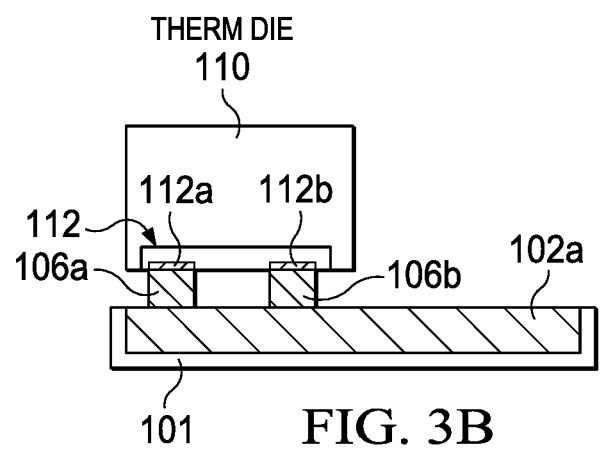
Figure 3C:
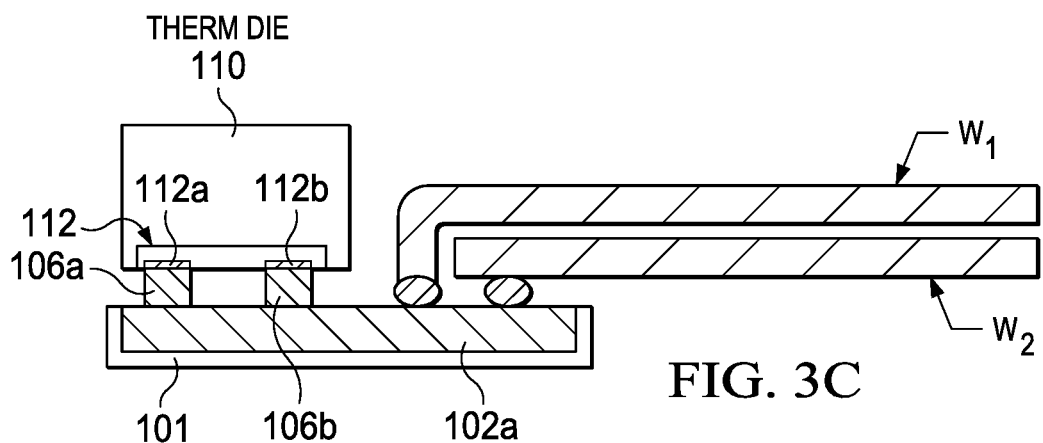

FIGS. 3A-3C shows enhanced side views of a disclosed die-based thermal probe after successive in-process assembly steps, with the completed die-based thermal probe shown as the thermistor die-based thermal probe 100 in FIGS. 1A and 1B. As described above, the thermistor die 110 can be provided by a wafer, such as having 1,000 to 5,000,000 thermistor die per wafer, where the thermistor die can be formed on a silicon wafer, and then diced up with both bond pads 112a and 112b being on one side of the thermistor die 110.

FIG. 3A shows a thermistor die 110 after die interconnects 106a, 106b are formed on the bond pads 112a and 112b. Example die interconnects material include Au, Al, Ag, Cu, Ni, Pd, solder, or an electrically conductive non-metal material such as an anisotropic conductive film (ACF) pre-attached onto the thermistor die 110. The die interconnects 106a, 106b can also comprise solder capped metal (e.g., solder capped Cu pillars).

FIG. 3B shows the thermistor die 110 after the die interconnects 106a, 106b are flip-chip attached to the traces shown as 102a on the mounting substrate 101, such as a flex circuit. FIG. 3C shows the in-process thermal probe after attaching wires shown as W1 and W2 to the first and second traces on the mounting substrate 101 shown as 102a. Generally any common electrical attachment method known in the art can be used, such as solder, gold-to-gold, conductive polymer, or ACF.

Figure 4:
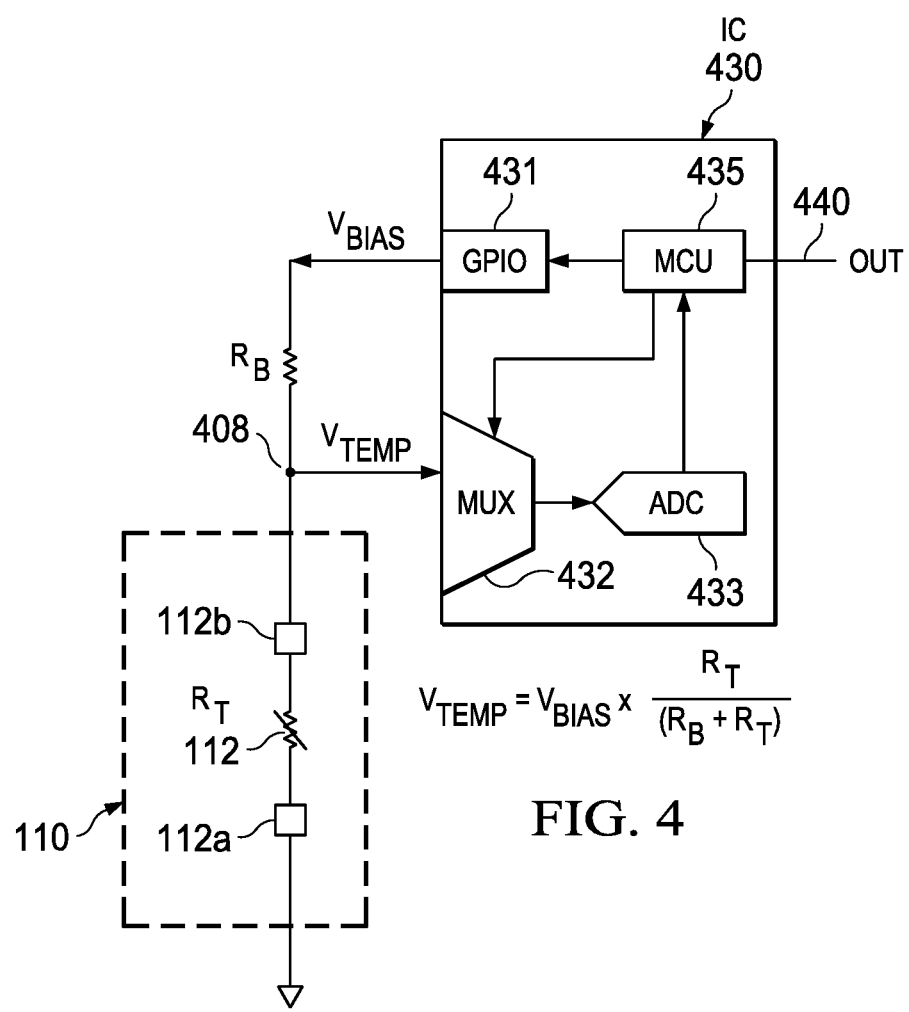
FIG. 4 shows an example thermistor die comprising a silicon substrate including a voltage divider comprising a thermistor, and signal processing circuitry of another IC coupled to receive an output from the voltage divider that provides an output for the thermal probe.

FIG. 4 shows an example thermistor die 110 that can comprise a silicon substrate with a thermistor thereon shown as $R_T$, as part of a voltage divider along with another resistor shown as $R_B$. The node between the resistors $R_B$ and $R_T$ shown as 408 is the output of the voltage divider provides the voltage shown as $V_{TEMP}$. IC 430 is shown including a processor shown as a microcontroller unit (MCU) 435, and a general-purpose input/output (GPIO) pin 431 that provides the bias voltage shown as $V_{BIAS}$ to the voltage divider. IC 430 also includes signal processing circuitry coupled to receive the $V_{TEMP}$ output from the voltage divider comprising a multiplexer (MUX) 432 that is coupled to an analog-to-digital converter (ADC) 433. The output of the IC 430 is shown as node 440. In another embodiment the thermistor die 110 includes one or all of the other devices shown in FIG. 4.

Disclosed thermistor die-based thermal probes enable miniaturization as compared to known thermal probes due largely due to the use of a die-based thermistor. There is generally no need to modify the device under temperature test in any way to utilize a disclosed thermistor die-based thermal probe for temperature sensing. Disclosed thermistor die-based thermal probes provide advantages including higher electrical performance (such as precision, accuracy, response time) because of the usage of the electrical and thermoelectrical properties of semiconducting materials that can be processed in this form and/or better mechanical performance (tensile strength, vibration, bending) due to the mechanical properties of the encapsulant material.

The system that is being temperature sensed benefits from disclosed thermistor die-based thermal probes because they are generally accurate, flexible, robust, and enable an electrical output that gives the temperature data signal to be transmitted a long distance to a processor which will be using the temperature data. Some example applications for temperature sensing for disclosed thermistor die-based thermal probes is for relatively larger sized mechanical systems where the electronics that receive the temperature signal are far from the sensed location, such as 4 inches to 10 feet away which is enabled by long wires for W1 and W2 that can be provided. For example, for the temperature sensing for automobiles, machines, factories, and heavy equipment. Also lasers or other optical devices can benefit from disclosed thermistor die-based thermal probes as such lasers and other optical devices may not easily integrate a temperature sensing element and the needed interconnections.

Those skilled in the art to which this Disclosure relates will appreciate that many other variations are possible within the scope of the claimed invention, and further additions, deletions, substitutions and modifications may be made to the described aspects without departing from the scope of this Disclosure.

The invention claimed is:

1. A method of fabricating a thermistor-based thermal probe, comprising:
   providing a first die interconnect and a second die interconnect coupled to first and second bond pads that are coupled across a thermistor on a thermistor die;
   directly attaching first and second wires to the first interconnect and to the second die interconnect, wherein the first and second wires extend a distance beyond the thermistor die; and
   forming an encapsulating material over the thermistor die and a die end of the first and second wires.

2. The method of claim 1, wherein the thermistor die comprises a silicon substrate, and wherein the first and second bond pads are both on a same side of the silicon substrate.

3. The method of claim 1, wherein the first die interconnect and the second die interconnect comprise solder.

4. The method of claim 1, wherein the thermistor has a 25° C. minimum temperature coefficient of 3,000 parts per million per ° C.

5. A method of fabricating a thermistor-based thermal probe, comprising:
   attaching a first die interconnect and a second die interconnect coupled to first and second bond pads that are coupled across a thermistor on a thermistor die to a first trace and to a second trace on a mounting substrate;
   forming first and second wire interconnects on the mounting substrate and then attaching first and second wires to the first and second traces using the first and second wire interconnects, wherein the first and second wires extend beyond the mounting substrate, and
   forming an encapsulating material over the thermistor die, the mounting substrate, and a die end of the first and second wires.

6. The method of claim 5, wherein the thermistor die comprises a silicon substrate, and wherein the first and second bond pads are both on a same side of the silicon substrate.

7. The method of claim 5, wherein the providing further comprises providing another die including signal processing circuitry, wherein the method further comprises attaching bond pads of the another die to other traces on the mounting substrate that couple to other bond pads on the thermistor die to form a voltage divider including the thermistor and couple the signal processing circuitry to receive an output from the voltage divider.

8. The method of claim 5, wherein the mounting substrate comprise a flexible polymer comprising substrate.

9. The method of claim 5, wherein the thermistor has a 25° C. minimum temperature coefficient of at least 3,000 parts per million per ° C.

10. The method of claim 5, wherein the first and second wires are coupled to the first and second traces by solder balls.

11. A thermistor-based thermal probe, comprising:
    thermistor die having a thermistor thereon with first and second bond pads coupled across the thermistor, and with first die interconnect and a second die interconnect coupled to bond pads;
    first and second wires that extend beyond the thermistor die attached to the first interconnect and to the second die interconnect; and
    an encapsulating material over the thermistor die, and a die end of the first and second wires.

12. The thermistor-based thermal probe of claim 11, wherein the thermistor die comprises a silicon substrate, and wherein the first and second bond pads are on a same side of the silicon substrate.

13. A thermistor-based thermal probe, comprising:
    thermistor die having a thermistor thereon with first and second bond pads coupled across the thermistor, and with first die interconnect and a second die interconnect coupled to bond pads, wherein the first die interconnect and the second die interconnect comprise solder;
    first and second wires that extend beyond the thermistor die attached to the first interconnect and to the second die interconnect; and
    an encapsulating material over the thermistor die, and a die end of the first and second wires.

14. The thermistor-based thermal probe of claim 11, wherein the thermistor has a 25° C. minimum temperature coefficient of at least 3,000 parts per million per ° C.

15. A thermistor-based thermal probe, comprising
    a mounting substrate and a thermistor die having a thermistor thereon with first and second bond pads coupled across the thermistor;
    first and second die interconnects coupled to the first and the second bond pads, wherein the first and second die interconnects are coupled to a first and a second trace on the mounting substrate;
    first and second wires that extend beyond the mounting substrate attached to the first and second traces by first and second wire interconnects on the mounting substrate, and
    an encapsulating material over the thermistor die, the mounting substrate, and a die end of the first and second wires.

16. The probe of claim 15, wherein the thermistor die comprises a silicon substrate, and wherein the first and second bond pads are on a same side of the silicon substrate.

17. The probe of claim 15, further comprising another die including signal processing circuitry, wherein bond pads on the another die are attached to other traces on the mounting substrate that couple to other bond pads on the thermistor die to form a voltage divider including the thermistor and couple the signal processing circuitry to receive an output from the voltage divider.

18. The probe of claim 15, wherein the mounting substrate comprise a flexible polymer comprising substrate.

19. The probe of claim 15, wherein the thermistor has a 25° C. minimum temperature coefficient of 3,000 parts per million per ° C.

20. The probe of claim 15, wherein the first and second wires are coupled to the first and second traces by solder balls.

21. The method of claim 1, further comprising another die including signal processing circuitry, wherein bond pads on the another die are coupled to bond pads on the thermistor die to form a voltage divider including the thermistor and couple the signal processing circuitry to receive an output from the voltage divider.

22. The probe of claim 11, further comprising another die including signal processing circuitry, wherein bond pads on the another die are coupled to bond pads on the thermistor die to form a voltage divider including the thermistor and couple the signal processing circuitry to receive an output from the voltage divider.

23. A method of fabricating a thermistor-based thermal probe, comprising:
providing a substrate;
forming a first trace and a second trace on the substrate;
attaching a thermistor die on the substrate, first and second bond pads on the thermistor die are coupled across a thermistor on a thermistor die;
coupling the first trace to the first bond pad via a first die interconnect;
coupling the second trace to the second bond pad via a second die interconnect;
coupling a first wire to the first trace;
coupling a second wire to the second trace, wherein the first and second wires extend beyond the mounting substrate; and
forming an encapsulating material over the thermistor die, the mounting substrate, and a die end of the first and second wires.

24. A thermistor-based thermal probe, comprising:
providing a substrate;
a first trace and a second trace on the substrate;
a thermistor die on the substrate, first and second bond pads on the thermistor die are coupled across a thermistor on a thermistor die;
a first die interconnect couples the first trace to the first bond pad;
a second die interconnect couples the second trace to the second bond pad;
a first wire coupled to the first trace;
a second wire coupled to the second trace, wherein the first and second wires extend beyond the mounting substrate; and
an encapsulating material covering the thermistor die, the mounting substrate, and a die end of the first and second wires.

\* \* \* \* \*